United States Patent [19]

Kunz

[11] 4,156,472

[45] May 29, 1979

[54] APPARATUS FOR AUTOMATICALLY CHANGING THE INTEGRATION TIME AND RESOLUTION OF AN ELECTRICAL SCALE UNDER PREDETERMINED OPERATING CONDITIONS

[75] Inventor: Peter Kunz, Tann-Ruti, Switzerland

[73] Assignee: Mettler Instrumente AG, Greifensee-Zurich, Switzerland

[21] Appl. No.: 882,618

[22] Filed: Feb. 28, 1978

[30] Foreign Application Priority Data

May 13, 1977 [CH] Switzerland .................... 5990/77

[51] Int. Cl.$^2$ ......................................... G01G 19/413
[52] U.S. Cl. ................................. 177/25; 177/DIG. 3
[58] Field of Search ............ 177/25, 210 FP, 210 EM, 177/210 C, 210 R, DIG. 3; 364/567, 466

[56] References Cited

U.S. PATENT DOCUMENTS

| 3,789,937 | 2/1974 | Strobel ...................... 177/DIG. 3 X |
| 3,826,319 | 7/1974 | Loshbough ............... 177/DIG. 3 X |

Primary Examiner—Joseph W. Hartary
Attorney, Agent, or Firm—Marianne Rich

[57] ABSTRACT

In an electrical scale, the weight of the load when the scale is in equilibrium is represented by counting pulses summed up over predetermined time intervals. The sum is displayed digitally. For such a scale, a control apparatus is furnished which automatically decreases the predetermined time intervals and also the number of digits in the display in response to a signal indicating that the scale is operating in a transient condition.

13 Claims, 6 Drawing Figures

APPARATUS FOR AUTOMATICALLY CHANGING THE INTEGRATION TIME AND RESOLUTION OF AN ELECTRICAL SCALE UNDER PREDETERMINED OPERATING CONDITIONS

BACKGROUND OF THE INVENTION

This invention relates to electrical scales having a load receiver and means associated with said load receiver for furnishing a plurality of counting pulses varying in number as a function of the weight of said load. The scale further has apparatus for summing the counting pulses over predetermined time intervals and a digital display for displaying the sum.

Several types of scales are included, such as, for example:

Scales with electromagnetic load compensation in which a current which is proportional to the weight is digitalized and displayed in units of weight. Such scales are for example described in U.S. Pat. Nos. 3,688,854 and 3,786,884.

Scales with mechanical oscillators, for example strings, whose frequency changes as a function of the weight of the applied load. The change in frequency constitutes the digital representation of the weight. Such a scale is described, for example in U.S. Pat. No. 3,897,681.

A number of mutually contradictory requirements must be considered when specifying the predetermined time intervals for summing up the counting pulses (integration time). On the one hand the accuracy of the indication and the resolution of same are to be as high as possible, which requires a relatively long integration time with correspondingly large number of digits in the display. On the other hand, the relatively long time required for such a measurement is not desirable and, where only a rough indication of the weight is desired, quite unnecessary. Thus scales with different integration times have already been suggested. In these, a manual activation of a switch allows switching from long integration times with high display resolution for exact weighings, to short integration times with a relatively low resolution for correspondingly less exact weighings and vice versa (U.S. Pat. Nos. 3,786,884 and 3,788,411). Among other difficulties, these known solutions have the drawback that the additional manual operation during weighing is too inconvenient to be competitive in today's market.

In U.S. Pat. No. 3,826,319, the possibility of varying the number of digits in the display as a function of the amount of undesired movement of the scale is indicated. This known arrangement has the disadvantage that the integration time remains the same throughout and is therefore no solution to the present problem.

U.S. Pat. No. 3,789,937 discloses a scale in which control means are provided to prevent a display of the weight while the moveable part of the scale is undergoing excessively large oscillations about its equilibrium position, and no display is furnished during the transient condition.

SUMMARY OF THE INVENTION

It is an object of the present invention to increase the operating efficiency and comfort of a scale by an automatic adjustment of the integration time and of the resolution as a function of the type of weighing being done or/and as a function of undesired transients such as for example, vibrations.

In accordance with the present invention, a scale comprises receiving means for receiving a load to be weighed. It comprises pulsing means connected to said receiving means, for furnishing a plurality of pulses varying in number as a function of the weight of said load, summing said pulses over predetermined time intervals and furnishing a counting signal signifying the number of so-counted pulses. Display means are provided for furnishing a digital display of said counting signals. Finally, control means are provided for automatically adjusting the length of said predetermined time intervals and the number of digits in said digital display as a function of then-present operating conditions.

In an analytic scale, a door must be opened while the substance to be weighed is applied to the scales or removed therefrom. While the door is open the pan tends to oscillate about its equilibrium position making an exact weighing practically impossible. Even air currents can affect the result. In a preferred embodiment of the invention, a switch is provided which is operated by the door and automatically causes a decrease in the integration time and in the number of digits of the display while the door is open.

In scales in which selectable references weights are provided for increasing the weighing range, a switch is provided which is coupled to the weight changing mechanism and causes a decrease in integration time and in the number of displayed digits while the weights are being changed.

In a further preferred embodiment of the invention, a microprocessor is utilized which, under program control, compares sequentially furnished counting signals and generates the control signal decreasing the integration time and the number of displayed digits when an excessively large difference between sequential weighing results occurs. In this embodiment two rather than one possible changes in integration time and digits displayed are furnished.

For scales with gravimetric dosing an embodiment of the present invention wherein an adjustable comparator is furnished which compares the actual weight on the scale with a predetermined weight is very advantageous. This embodiment allows automatic control from the rough dosing to the fine dosing with corresponding changes in integration time and number of digits displayed. This full automation results in a considerable saving in time.

The present invention, both as to its construction and its method of operation, together with additional objects and advantages thereof, will best be understood from the following description of preferred embodiments when read in connection with the accompanying drawing.

DESCRIPTION OF THE PREFERRED EMBODIMENTS

The first embodiment of the invention is described with reference to a scale having electromagnetic force compensation by current pulses. This type of scale is described in detail in U.S. Pat. No. 3,786,884 which is hereby incorporated by reference. A short summary of the operation of such a scale will be included below for convenience. The invention is not, however, limited to such scales.

Figure 1:
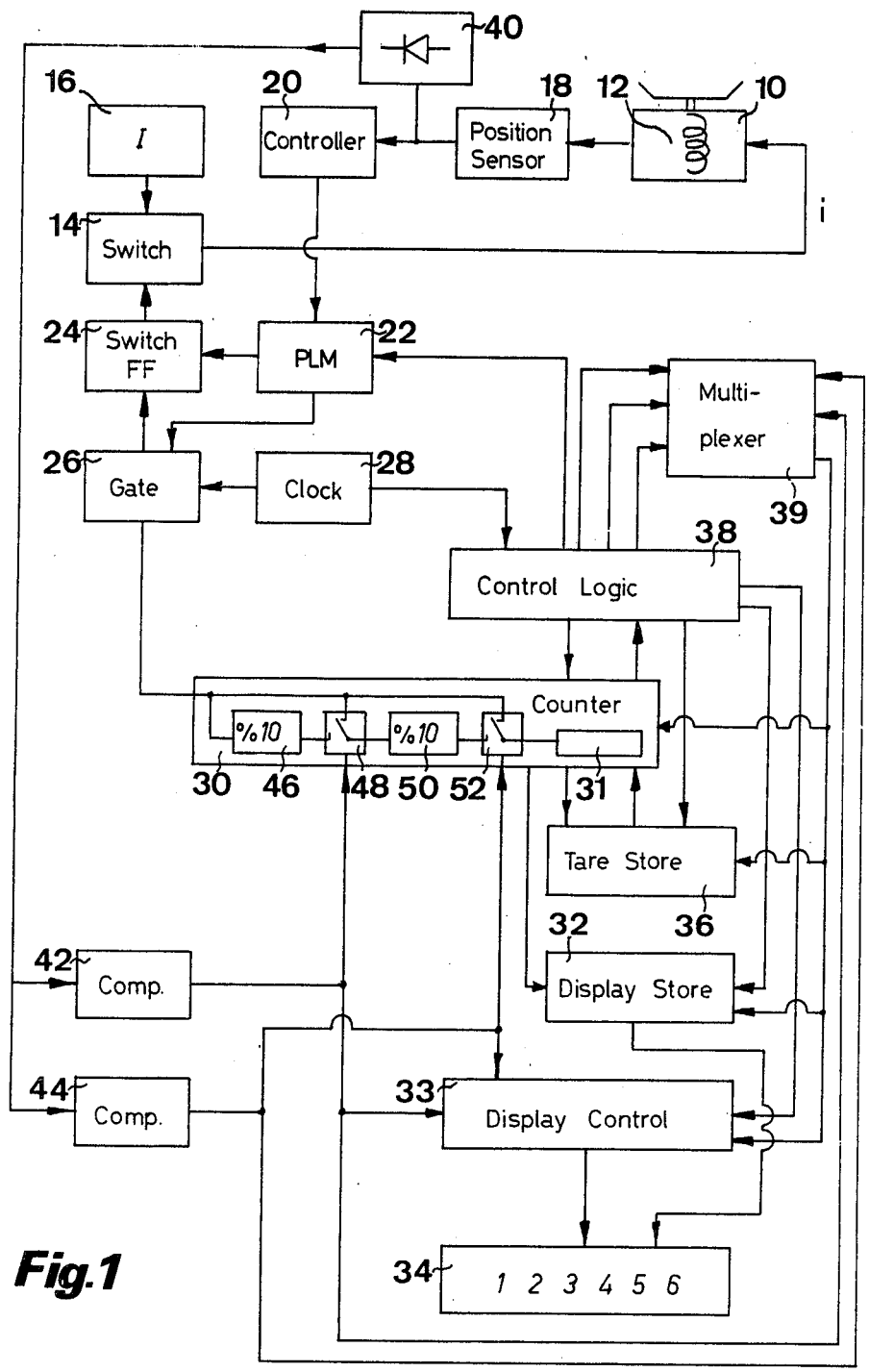
FIG. 1 is block diagram of the first embodiment of the present invention.

Referring to FIG. 1, scale 10 includes a coil 12 located in the air gap of a permanent magnet system. The coil periodically receives pulses from a constant current source 16 under control of a switch 14. Sensing means, here a position sensor 18, furnish a voltage having an amplitude varying as a function of the position of the moveable parts of the scale relative to a reference position. This voltage is applied to a shaping circuit 20 whose output controls a pulse width modulator 22. Pulse width modulator 22 compares a periodic sawtooth voltage to the output of stage 20 and, through a flip-flop 24 and switch 14, controls the width of the compensating current pulse. Further, pulse width modulator 22 controls a transmission gate 26 in synchronism with switch 14. The other input of gate 26 continuously receives high frequency counting pulses from a clock generator 28. While the compensating current is being applied to coil 12, gate 26 is open and the clock pulses (counting pulses) are applied to counter 30. The counting signal generated by counter 30 is transferred at regular intervals (predetermined time intervals) to a display store 32 and from there through a display control 33 to the actual digital display 34. A tare store 36 is also provided, to allow an indication of net weight rather than gross weight.

The above-described apparatus operates under control of logic circuits 38 (control means) and is synchronized by clock pulses from a clock 28.

The above-described prior art apparatus is modified as follows in accordance with the present invention: The signal from position sensor 18 (sensed signal), in addition to being applied to the shaping circuit 20, is rectified by a rectifier 40 and the so-rectified signal is applied to a first and second comparator 42, 44. Each of the comparators compares the applied signal to a preset threshold value. Each furnishes a comparator output signal if the applied signal exceeds the preset threshold value. The comparator output signals are applied to counter 30, display control 33 and a multiplexer 39, which will be described in greater detail with reference to FIG. 6.

Counter 30 is an up/down counter which comprises a plurality of counting stages for the higher decimal values, schematically indicated by box 31, as well as a least significant counting stage 46 with an associated switch 48, and a next higher counting stage 50 with an associated switch 52.

Figure 6:
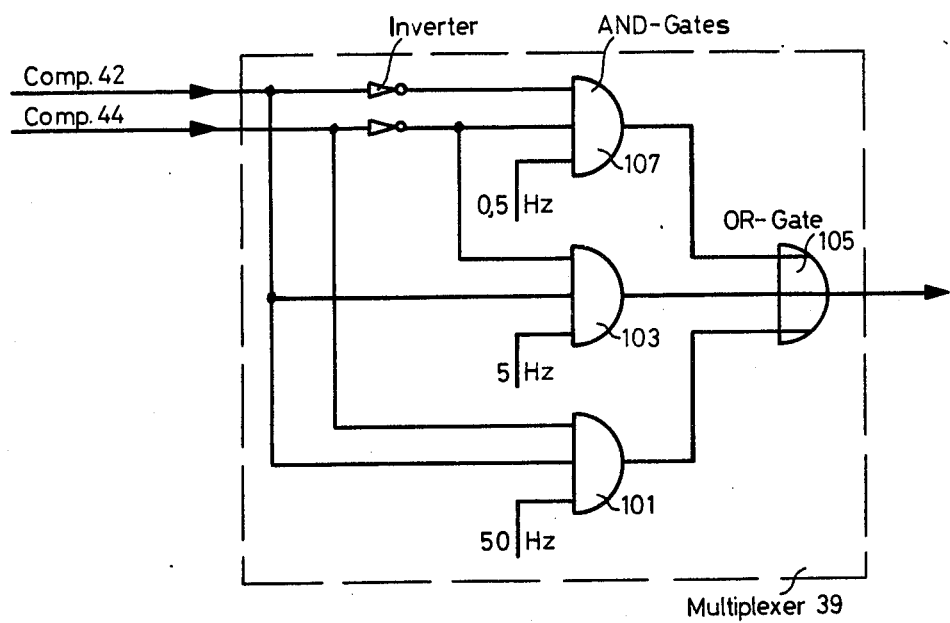
FIG. 6 is a schematic diagram of the multiplexer of FIG. 1.

The operation of the apparatus will be described by means of an example. First, the vessel on the scale 10 is tared in conventional fashion, causing the display to indicate zero. The substance to be weighed is then transferred to the pan. The quick increase in load causes a large change in the sensed signal 18 and the thresholds of comparators 42 and 44 are crossed. Both comparators furnish a comparator output signal. These are applied to multiplexer 39. As shown in FIG. 6 the two comparator output signals are applied respectively to the first and second input of an AND gate 101 whose third input receives a 50 Hz signal from control logic 38. The resultant 50 Hz signal at the output of AND gate 101 is transferred through OR gate 105 to the output of multiplexer 39. The output of multiplexer 39 controls the transfer from counter 30 to the display store 32 and display 34, that is a transfer takes place from the counter to the display every 20 milliseconds. Referring again to FIG. 1, switches 48 and 52 are open, that is in a state wherein pulses from gate 26 are directly applied to the third lowest counting stage of counter 30. Finally, display control circuit 33 activates only the display of the four most significant digits. The two least significant digits are blanked. It should be noted that the display control could equally well be arranged to energize only the three most significant digits. The number of activated digits is not directly a function of the decrease in integration time.

A rough indication of the weight of the substance being applied to the scale is thus available almost immediately to the scale operator.

When the weight of the substance approaches the desired weight the substance is added at a slower rate. The departure from the starting position of the moveable parts of the scale decreases, thereby decreasing the amplitude of the signal at the output of sensor 18. The threshold of comparator 44 is no longer crossed. This causes switch 52 to close (that is the counting pulses are applied through the next to the lowest significant stage in counter 30). AND gate 101 (FIG. 6) becomes nonconductive, while AND gate 103 becomes conductive. The frequency of the signal applied at the third input of AND gate 103 is 5 Hz. This 5 Hz signal reaches the output of multiplexer 39 through OR gate 105 and, as discussed above, controls the transfer of the counting signal from counter 30 to display 34. However, the time intervals at which the transfer takes place and now 0.2 sec., corresponding to a frequency of 5 Hz. At the same time, display control 33 causes the five most significant digits of display 34 to be energized.

In other words, a reasonably exact indication of the weight of the substance is already available after a slightly lengthened evaluation.

When the amount of substance added to the pan of the scale is very close to the desired value, the addition of substance takes place very slowly and so the amplitude of the signal of the output of sensor 18 is too low to cause an output from either comparator 44 or comparator 42. At this point the apparatus reverts to its (normal) operation with highest resolution. First, AND gate 103 and 101 are both blocked while AND gate 107 is conductive. The third input of AND gate 107 receives a signal of 0.5 Hz frequency which, when transmitted to the output of multiplexer 39 through OR gate 105, causes the transfer from counter 30 to display 34 to take place at 2 second intervals. Further, the absence of the compartor output signal from comparator 42 causes switch 48 to close which causes the counting signals to become effective at the least significant stage of the counter. All digits of display 34 are energized.

It is obvious that the above-described embodiment not only saves time but also greatly increases the comfort of the scale operator. The latter is true in particular with respect to eye strain, since fewer digits of the display are changing during the weigh-in operation. It should further be noted that the decreased integration time allows the value which is displayed to approach the actual weight on the scale to a much higher degree than do conventional systems.

If it is to be avoided that the comparator output signals interrupt one integration cycle in order to switch to the other, thereby causing a random number to be displayed, then the switching of the integration time, switches 48 and 52 and the display control circuit can all be synchronized to operate only at the end of the then-present integration period. This can be accomplished by connecting a dynamic flip-flop, clocked by the trailing edge of the multiplexer output signal, to the output of each comparator.

The automatic apparatus described above in relationship to a weigh-in operation would of course operate similarly when the scale is subject to external disturbances. Under these conditions also, the scale operator would at least have a rough idea of the weight on the scale before the scale settled down again.

In a further preferred embodiment, the apparatus is so arranged that one of the comparators decreases the integration time as well as the number of digits in the display, while the second comparator blanks the whole display.

Another embodiment is possible wherein the output pulses of gate 26 are always applied to the lowest counting stage. However, when the counting signal is transferred to the display, the signal is applied to the higher display stages rather than the normal display stages. This operation is carried out in display control 33 under control of the comparator output signals is essentially the same manner as was the displacement of the counting pulses relative to counter 30. This has the advantage that the same number of pulses in the counting signal signifies the same number independent of integration time. The computation of net weight from gross weight followed by the subtraction of a previously stored tare is thus facilitated. Alternatively, if the number of counting stages has been changed for different integration times, controllable multiplier circuit blocks or a microprocessor may be used so that the digits in the product have the same significance as the digits in the stored tare value. This embodiment also allows integration time to be changed by other than powers of 10.

Figure 2:
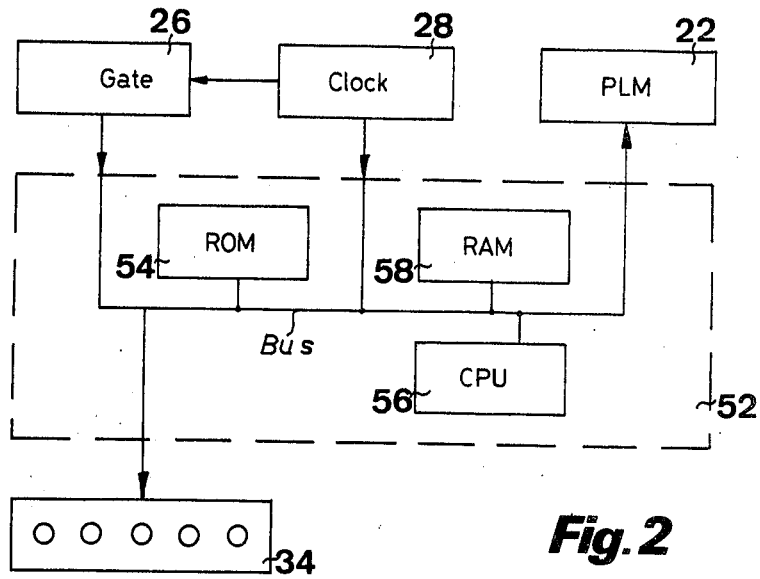
FIG. 2 shows the control means of a second embodiment.

A second embodiment of the present invention is shown in FIG. 2. Here a microcomputer 52 cooperates with clock 28, gate 26, pulse width modulator 22 and display 34 to carry out an operation similar to that detailed above with reference to the first embodiment. The synchronization and overall control of the operation of the equipment is achieved by a program stored in read-only memory 54. Under control of this program, the pulses transmitted through gate 26 are counted in the central processing unit 56. Sequential values of the counting signals computed in central processing unit 56 are subtracted from each other and the difference compared to limiting differences stored in memory 54. The integration time and the number of digits in the display which are energized are then a function of the result of the comparison. Alternatively, conventional digital circuits could be utilized to carry out all the above-described computations.

In a mixed embodiment, counting could take place externally to a microcomputer, while the latter would carry out the comparison, and the control of the integration time and the number of digits in the display.

Figure 3:
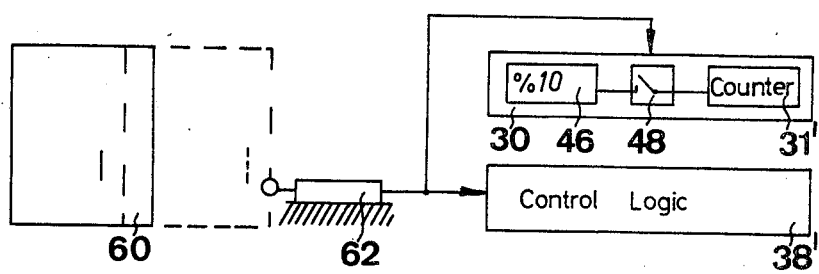
FIG. 3–5 are schematic representations of further embodiments of the present invention.

FIG. 3 illustrates an embodiment particularly useful with a conventional analytic scale. This type of scale has an enclosure which protects the scale from air currents. The enclosure has one or more sliding doors to provide access. The pan may be standing or suspended.

The sliding door 60 of such a known analytic scale is shown on the open position in FIGS. 3. The closed position is indicated by dashed lines. A switch 62 is operatively connected to the door 60. The switch interacts with control logic 38' and the counter 30' as follows:

A. If the door 60 and therefore switch 62 are closed, the scale operates normally, that is with full integration time and full resolution.

B. If door 60 is opened, for example for putting weight on the scale, switch 62 also opens. This causes a shortening of the integration time to one-tenth of the normal value, application of counting pulses to the next lowest rather than the lowest place in counter 30', and a blanking of the two least significant places in the display.

When door 60 is again closed the operation detailed under A. above will resume.

The operation of the individual components in FIG. 3 is the same as that of FIG. 1, only difference being that only two operating modes are provided, that is two integration times and two resolutions.

If the scale has more than one door, a switch is associated with each door and all switches are connected in series, so that opening of any one door suffices to achieve the operating conditions specified under B.

Figure 4:
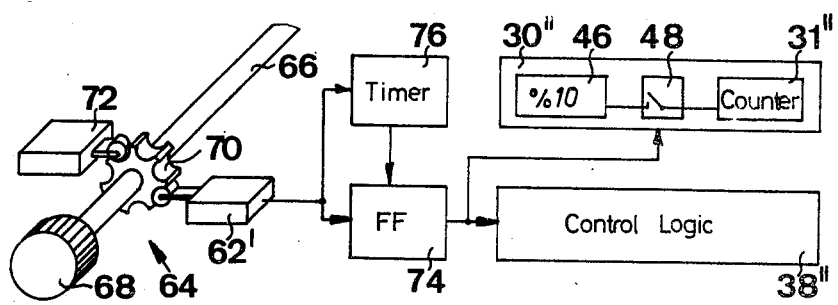

The embodiment as shown in FIG. 4 is similar to that shown in FIG. 3 in that two operating states of the scale are provided. Here, however, the control is by means of a switch 62' which is operatively connected to a weight changing apparatus 64. Specifically, rotation of a cam shaft 66 by a control grip 68 causes weights to be lifted off or lowered. (This mechanism is known and therefore no further explanation will be given). A cam 70, which is mounted on the shaft 66 for rotation therewith, operates switch 62'. A springloaded stop cyliner 72 defines the position of cam 70 after the switching process is finished. In the position shown, switch 62' is closed.

If shaft 66 is rotated, cam 70 interrupts the electrical connection in switch 62' and this interruption causes a shortening of the integration time to 1/10 of the normal value and a decrease in the number of digits of the display by two, as explained with reference to FIG. 3. If the switch is closed again, the equipment returns to its normal operation. In order to prevent a constant changing of the operating mode of the equipment while weights are being changed and switch 62' is continuously opened and closed, a delay member 76 is provided. This prevents the scale from returning to the normal operating mode for a predetermined delay time (for example 2 seconds) following the last closing of switch 62'. Thus the scale will not return to its full integration time and full resolution until two seconds after the last change of weights.

Figure 5:
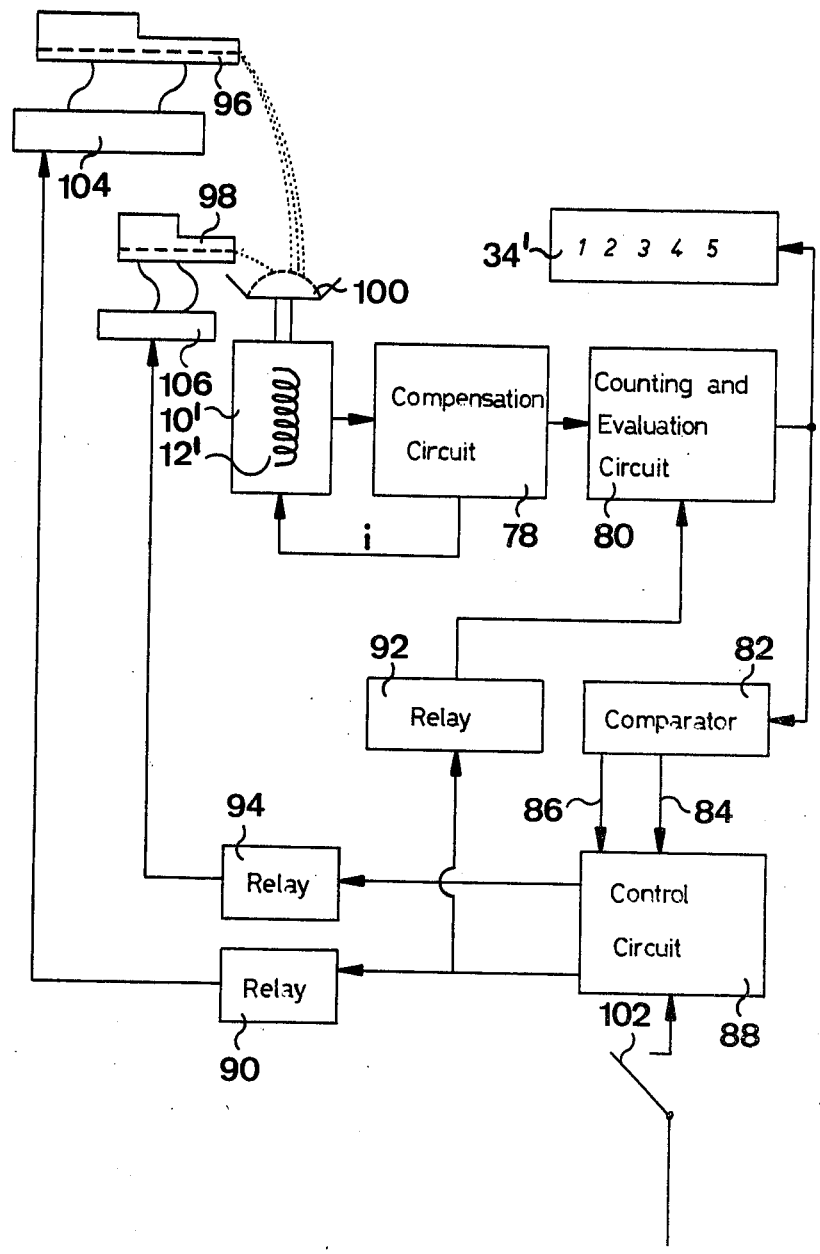

The embodiment shown in FIG. 5 shows a dosing scale. Scale 10' has a compensating circuit 78 which includes the position sensor, control and comparator circuits, and constant current source whose current i is applied to coil 12'. The counting pulses whose number is proportional to the weight on the scale are applied to a counting and evaluation circuit 80 which furnishes a ditial counting signal to display 34' and to a digital comparator 82. Digital comparator 82 has two thresholds, and furnishes two output signals 84, 86 which are utilized to control three relays 90, 92 and 94 via a sequencing circuit 88.

The load to be dosed is, in conventional fashion, applied to pan 100 by means of vibrators 96, 98. Vibrator 96 carries out the coarse dosing, while vibrator 98 does the fine dosing.

The dosing sequence is the following:

The threshold values for comparator 82 are set (found either empirically or mathematically).

A starting key 102 is then depressed. This activates drive 104 of vibrator 96 via relay 90. Simultaneously, relay 92 controls the counting and evaluation circuit 80 to shorten the integration time to 1/10 of the normal value and to decrease the number of digits in display 34' by one place. When the weight on the scale reaches the first threshold value of comparator 82, the output signal on line 84 causes relays 90 and 92 to be deactivated and relay 94 to pull in. Vibrator 96 is shut off and vibrator 98 is activated. Simultaneously, the normal integration time is restored and a full display furnished. If the final desired value (second threshold value of comparator 82) is reached, a signal 86 causes vibrator 90 to be deactivated by deactivating relay 94. After the metered substance is removed from the scale a new cycle can be started by introducing a new dish and taring.

In an alternate preferred embodiment vibrator 98 operates even during the operation of vibrator 96, thereby saving some time. Also, a single vibrator with two different transport speeds could be utilized instead of two vibrators. Further, drives 104, 106 may allow adjustment of the dosing speed.

While the present invention has been described and illustrated with certain preferred embodiments, many variations and combinations will occur to one skilled in the art. For example, scales utilizing vibrating strings can also profit from the present invention, although they are more readily adaptable to the digital embodiments. Microcomputers can be substituted for the conventional circuits. The integration times need not be divided on a decimal basis, but could, for example, be subdivided into binary stages. For scales which have external data recorders, the data output may be blocked during the shortened integration times.

The embodiments shown in FIG. 1 and FIG. 2 are particularly useful for weighing animals. By adjusting the integration time to the amount of movement of the scale, optimum results relative to the required weighing time and accuracy can be achieved.

While the invention has been illustrated in preferred embodiments, it is not to be limited to the circuits and structures shown, since many variations thereof will be evident to one skilled in the art and are intended to be encompassed in the present invention as set forth in the following claims:

I claim:

1. Electrical scale, comprising, in combination, receiving means for receiving a load to be weighed; pulsing means for furnishing a plurality of pulses varying in number as a function of the weight of said load, summing said pulses over predetermined time intervals and furnishing a counting signal corresponding to the number of so-counted pulses; display means connected to said pulsing means for furnishing a digital display of said counting signal; and control means connected to said pulsing means and said display means, for automatically adjusting both the number of places in said digital display and the length of said predetermined time intervals in accordance with the then-present operating conditions.

2. Equipment as set forth in claim 1, wherein said scale further comprises a door enclosing a weighing space when closed; and wherein said control means comprises a switch coupled to said door and having a first and second switching state when said door is open and closed respectively, and means for automatically decreasing the number of digits in said display and the length of said predetermined time intervals when said switch changes from said second to said first switching state.

3. Equipment as set forth in claim 1, wherein said scale further comprises reference weight changing apparatus for extending the operating range of said scale; and wherein said control means comprises switch means operatively coupled to said reference weight changing apparatus and having a first switching state when said weight changing apparatus is operating and a second switching state when said weight changing apparatus is at rest, and means for automatically decreasing the number of digits in said display and the length of said predetermined time intervals when said switch changes from said second to said first switching state.

4. Equipment as set forth in claim 1, wherein said then-present operating conditions comprise a transient state and a quiescent state; and wherein said control means comprises means for adjusting said predetermined time intervals to first and second predetermined time intervals and the number of digits in said display to a first and second number when said scale is in said transient and quiescent state respectively.

5. Equipment as set forth in claim 4, wherein said second predetermined time intervals are longer than said first predetermined time intervals and said second number is greater than said first number.

6. Apparatus as set forth in claim 4, wherein said control means comprises means for comparing sequential ones of said counting signals, furnishing a difference signal corresponding to the difference therebetween and furnishing a transient signal indicative of said transient state when said difference exceeds a predetermined difference.

7. Equipment as set forth in claim 6, wherein said pulsing means comprises summing means for furnishing digital counting signals; and wherein said summing means and said control means constitute a microprocessor, said microprocessor having a central processing unit for calculating said differences and furnishing said control signal under program control, a random access memory operatively associated with said central processing unit for storing intermediate results calculated therein, and a read-only memory for furnishing said program control and for storing said predetermined difference.

8. Equipment as set forth in claim 1, wherein said receiving means moves from a predetermined starting position past a first predetermined limiting position during application of said load; wherein said pulsing means further comprises sensing means for sensing the position of said receiving means and furnishing a sensed signal varying as a function thereof; and wherein said control means comprises comparator means having a predetermined threshold level corresponding to said first predetermined limiting position, for comparing said sensed signal to said threshold level and furnishing a comparator output signal when said sensed signal exceeds said threshold level, and logic circuit means connected to said comparator means for decreasing said predetermined time intervals and the number of places in said digital display in response to said comparator output signal.

9. Equipment as set forth in claim 8, wherein said receiving means moves from a predetermined starting position past a first and second predetermined limiting position during application of said load; wherein said comparator means comprises first and second comparator means having a first and second predetermined threshold level corresponding, respectively, to said first and second predetermined limiting position and furnishing a first and second comparator output signal when said sensed signal exceeds said first and second threshold level respectively; and wherein said logic circuit means comprises means for decreasing said predetermined time intervals and the number of places in said digital display to respective first values in response to said first comparator output signal and respective second values in response to said second comparator output signal.

10. Apparatus as set forth in claim 8, wherein said sensing means comprises means for furnishing a sensed signal having an amplitude varying as a function of said position of said receiving means; wherein said pulsing means comprises pulse width modulator means connected to said sensing means for furnishing a sequence of control pulses each having a pulse width corresponding to said amplitude of said sensed signal, clock pulse generator means for generating clock pulses at a frequency substantially higher than the frequency of said control pulses, summing means, and gating means for gating said clock pulses to said summing means under control of said control pulses.

11. Equipment as set forth in claim 10, wherein said logic circuit means comprises means for transferring said counting signal to said display means at first predetermined time intervals in response to said comparator output signal and at second predetermined time intervals exceeding said first predetermined time intervals in the absence of said comparator output signal.

12. Equipment as set forth in claim 11, wherein said summing means comprises a counter having a plurality of counting stages starting with a least significant counting stage; and wherein said logic circuit means further comprises means for applying said clock pulses transmitted by said gating means to said least significant counting stage in the absence of said comparator output signal and to a selected higher counting state in the presence of said comparator output signal.

13. Equipment as set forth in claim 1, wherein said load is applied to said scale at a first predetermined rate at the start of weighing, and a second predetermined rate less than said predetermined rate after the weight of said load has reached a first reference weight; and wherein said control means comprises comparator means for comparing each of said counting signals to a reference signal signifying said first reference weight and furnishing a comparator output signal when said counting signal is indicative of a weight corresponding to said first reference weight, and means for increasing said predetermined time intervals, increasing the number of digits in said digital display, and decreasing said rate of application of said load to said second predetermined rate in response to said comparator output signal.

* * * * *